United States Patent
Kuriyama et al.

(10) Patent No.: US 7,031,744 B2
(45) Date of Patent: Apr. 18, 2006

(54) COMPACT CELLULAR PHONE

(75) Inventors: Toshihide Kuriyama, Tokyo (JP); Eiji Hankui, Tokyo (JP)

(73) Assignee: NEC Corporation, Tokyo (JP)

( * ) Notice: Subject to any disclaimer, the term of this patent is extended or adjusted under 35 U.S.C. 154(b) by 749 days.

(21) Appl. No.: 09/998,242

(22) Filed: Dec. 3, 2001

(65) Prior Publication Data

US 2002/0068602 A1 Jun. 6, 2002

(30) Foreign Application Priority Data

Dec. 1, 2000 (JP) ............................... 2000-366700

(51) Int. Cl.
*H04M 1/00* (2006.01)
(52) U.S. Cl. ............................... 455/550.1; 455/575.1; 455/575.3; 455/575.5; 455/575.7
(58) Field of Classification Search ................ 455/550, 455/575.1, 575.3, 575.5, 575.7; 343/702, 343/700, 725, 742
See application file for complete search history.

(56) References Cited

U.S. PATENT DOCUMENTS

| | | | |
|---|---|---|---|
| 4,992,799 A | | 2/1991 | Garay |
| 5,337,061 A | * | 8/1994 | Pye et al. .................... 343/702 |
| 5,451,965 A | * | 9/1995 | Matsumoto ................. 343/702 |
| 5,486,836 A | | 1/1996 | Kuffner et al. |
| 5,649,306 A | | 7/1997 | Vannatta et al. |
| 5,752,204 A | | 5/1998 | Epperson et al. |
| 5,905,467 A | * | 5/1999 | Narayanaswamy et al. . 343/702 |
| 6,005,525 A | * | 12/1999 | Kivela ......................... 343/702 |
| 6,011,519 A | * | 1/2000 | Sadler et al. ................ 343/742 |
| 6,442,400 B1 | * | 8/2002 | Ying et al. ................. 455/552.1 |
| 6,806,835 B1 | * | 10/2004 | Iwai et al. ................... 343/702 |

FOREIGN PATENT DOCUMENTS

| | | |
|---|---|---|
| EP | 0 508 567 A2 | 10/1992 |
| EP | 0 871 236 A2 | 10/1998 |
| JP | 2-13842 | 4/1990 |
| JP | H03-280625 | 12/1991 |
| JP | H06-112880 A | 4/1994 |
| JP | H11-177485 | 7/1999 |
| JP | 11-220418 | 8/1999 |
| JP | 2000-507781 | 6/2000 |
| JP | 2000-261532 A | 9/2000 |
| WO | WO 98/01919 A2 | 1/1998 |
| WO | WO 00/35124 A2 | 6/2000 |
| WO | WO 00/67342 A1 | 11/2000 |

OTHER PUBLICATIONS

Patent Abstracts of Japan, vol. 1999, No. 12, Oct. 29, 1999.
Patent Abstracts of Japan, vol. 2000, No. 5, Sep. 14, 2000.
Patent Abstracts of Japan, vol. 16, No. 104 (D-1178), Mar. 13, 1992.

* cited by examiner (Continued)

Primary Examiner—Curtis Kuntz
Assistant Examiner—Tuan Pham
(74) Attorney, Agent, or Firm—Sughrue Mion, PLLC

(57) ABSTRACT

A compact cellular phone with a foldable configuration and two planar antennas having outward directivities are provided inside the compact cellular phone in the foldable configuration. An interval between the two planar antennas provided to a pair of housings is equal to or wider than a width of a human palm in a state in which the compact cellular phone is open. The two planar antennas are planar inverse F-type antennas or patch antennas and impedance around each of the two planar antennas is measured. Then, one of the two planar antennas, which has a preferred transmission characteristic, is selected and used.

7 Claims, 7 Drawing Sheets

*directivity of antenna* directivity of antenna

13B; planar antenna
13A; planar antenna directivity of antenna directivity of antenna 13B; planar antenna 13A; planar antenna 13A; planar antenna 13B; planar antenna

COMPACT CELLULAR PHONE

BACKGROUND OF THE INVENTION

1. Field of the Invention

The present invention generally relates to a compact cellular phone, and more particularly to the compact cellular phone in which a pair of housings formed in an approximate flat shape is foldably connected by using a hinge.

The present application claims priority of Japanese Patent Application No. 2000-366700 filed on Dec. 1, 2000, which is hereby incorporated by reference.

2. Description of the Related Art

As shown in FIG. 1A, in a configuration of a conventional cellular phone, a whip antenna 14 has a ¼ wave length or ½ wave length and is provided to a housing 15. And the whip antenna 14 can be retracted into the housing 15. A coil antenna 16 is wound around dielectrics provided at a top end of the whip antenna 14. When the whip antenna 14 is retracted into the housing 15, the coil antenna 16 remains outside the housing 15 and serves as an antenna for a transmission instead of the whip antenna 14. In addition, a planar inverse F-type antenna (not shown) is provided inside the housing 15. Thus, a diversity antenna system is made up of the whip antenna 14, the coil antenna 16 and the planar inverse F-type antenna, whereby a phasing caused by multiplex wave can be prevented and a preferable transmission feature can be maintained.

Alternatively, instead of using the whip antenna 14 and the coil antenna 16, as shown in FIG. 1A; a cellular phone may include the planar inverse F-type antenna (not shown) or a planar antenna 17 such as a patch antenna inside a housing 18 as shown in FIG. 2A.

Since the cellular phone is generally contacted with a human head to use, a radio wave emitted from the antenna 14, 16, or 17 is partially blocked by the human head which causes a transmission quality to be degraded. Particularly, the whip antenna 14 or the coil antenna 16 has an isotropic directivity in a surface perpendicular to an axis of the whip antenna 14 or the coil antenna 16 as shown in FIG. 1B. Thus, the radio wave is transmitted toward a human body and a transmission efficiency is deteriorated by the blocking of the radio wave by the human head. As a result, the transmission quality is remarkably degraded.

On the other hand, in a surface perpendicular to the planar antenna 17 such as the planar inverse F-type antenna (not shown) or the patch antenna as shown in FIG. 2A, the planar antenna 17 has a directivity having a greater gain in a direction opposite to a ground board as shown in FIG. 2B and a small amount of radio wave transmits to a side of the human head. Thus, a deterioration of the transmission quality affected by the human head can be suppressed to be smaller. However, in a waiting state, the planar antenna 17 having the directivity of the great gain at only one side of the ground board has problems to send or receive the radio wave between the planar antenna 17 and a base station (not shown) located at an opposite side to a direction in which the planar antenna 17 has a greater directivity.

Also, in a case of using the planar antenna 17 alone, when the planar antenna 17 is covered with a hand holding the cellular phone, the transmission effect is remarkably degraded and then a degraded transmission quality disconnects a transmission.

In order to suppress degrading the antenna characteristics affected by the human head and realize a stable transmission, the Japanese Laid-open Patent Application No. Hei 11-220418 discloses an "Outer Antenna Device for Cellular Phone" in which a technology is disclosed to mount the outer antenna at a bottom surface of the cellular phone. However, since another device for the outer antenna is mounted outside the cellular phone, it is cumbersome to handle the entire cellular phone and a device shape becomes large-sized.

SUMMARY OF THE INVENTION

In the view of the above, it is a general object of the present invention to provide a compact cellular phone in which the above-mentioned problems are eliminated.

A more specific object of the present invention is to provide the compact cellular phone which is difficult to be influenced by a human head and hand, and which always maintains a preferred transmission quality in both of a waiting state and a transmitting state.

According to an aspect of the present invention, there is provided a compact cellular phone in which a pair of housings formed in an approximate flat shape is foldably connected by using a hinge, the compact cellular phone including:

two planar antennas provided to the pair of housings, respectively, so that a highly sensitive surface of each of the two planar antennas is directed outward in a state in which the compact cellular phone is closed.

In the foregoing, a preferable mode is one wherein an interval between the two planar antennas provided to the pair of housings is equal to or wider than a width of a human palm in a state in which the compact cellular phone is open.

Another preferable mode is one wherein the two planar antennas are provided outermost inside the pair of housings, respectively, in a state in which the compact cellular phone is closed Still another preferable mode is one wherein the two planar antennas are two planar inverse F-type antennas or two patch antennas.

A further preferable mode is one wherein when the compact cellular phone is used while being closed in a waiting state, both of the two planar antennas or either one of the two planar antennas is used to send or receive, and when the compact cellular phone is used while being open in a communication state, one of the two planar antennas, which has the better transmission state, is selected to send and receive.

An additional preferable mode is one wherein by detecting and evaluating an impedance change and a physical quantity of a reflective wave caused by the impedance change on an electric-power transmission path provided inside the compact cellular phone, one of the two planar antennas, which has preferred transmission characteristics, is determined, selected, and then used.

With configurations of the above aspect, in the waiting state in which the compact cellular phone is closed, the compact cellular phone has directivities at both sides. Thus, it is possible to improve the transmission characteristics between the base station and the compact cellular phone. In addition, in the communication state in which the compact cellular phone is opened and receives from and send to the base station, the directivities of the planar antennas 13A and 13B oppositely direct to a side of the human body. Thus, the influence of absorbing the radio wave into the human body hardly occurs and then it is possible to maintain the preferred transmission characteristics.

Furthermore, it possible to eliminate the influence by the human hand holding the compact cellular phone by using at least one of the planar antennas 13A and 13B. Therefore, the preferred transmission characteristics can be maintained.

BRIEF DESCRIPTION OF THE DRAWINGS

Other objects, features, and advantages of the present invention will become more apparent from the following detailed description when read in conjunction with the accompanying drawings, in which.

DESCRIPTION OF THE PREFERRED EMBODIMENTS

Best modes for carrying out the present invention will be described in further detail using an embodiment and an example with reference to the accompanying drawings.

Embodiment

A compact cellular phone has a foldable configuration and two planar antennas having outward directivities are provided inside two housings in the foldable configuration, respectively. In addition, in awaiting state in which the compact cellular phone is closed and used, both of the two planar antennas or at least one of the two planar antennas is used to transmit. In a communication state in which the compact cellular phone is opened and used, one planar antenna having the better transmission condition between the two planar antennas is selected and used. A space provided between the two planar antennas provided to the compact cellular phone is at least equal to or greater than a palm width (of a human hand) in an open state in which the compact cellular phone is open.

Also, a planar inverse F-type antenna or a patch antenna can be used as the planar antenna. For each of the two planar antennas, an impedance change is detected and also an physical quantity of a reflective wave caused by the impedance change on an electric-power transmission medium provided inside the compact cellular phone is detected.

With the above embodiment, the two planar antennas can realize wider directivities and the transmission characteristics between the compact cellular phone and a base station is improved more than a case of using a single planar antenna. Also, it is possible to obtain the transmission quality which maintains better quality than a conventional whip antenna or coil antenna.

Moreover, in the communication state in which the compact cellular phone is open and used, since the two planar antennas have higher sensitivities outward only (opposite to a human head side, the human head less influences the two planar antennas. In addition, an impedance evaluation selects one of the two planar antennas, which one planar antenna is not covered with the palm of the human hand. Thus, it is possible to prevent an attenuation caused by the palm of the human hand. Consequently, it is possible to obtain a preferred transmission quality in both of the waiting state and the communication state.

EXAMPLE

Figure 1A:
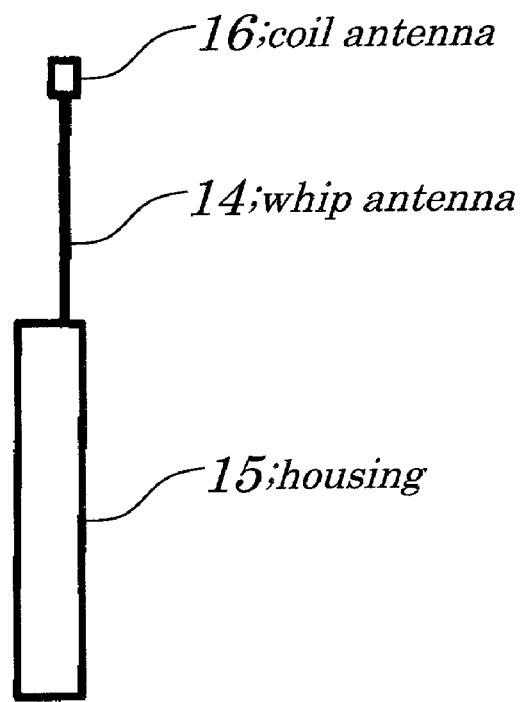
FIG. 1A is a diagram showing a conventional cellular phone using a whip antenna and FIG. 1B is a diagram showing a directivity of the whip antenna in the conventional cellular phone shown in FIG. 1A.
Figure 1B:
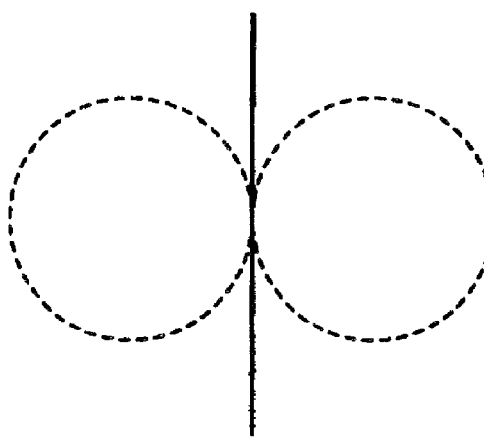
Figure 2A:
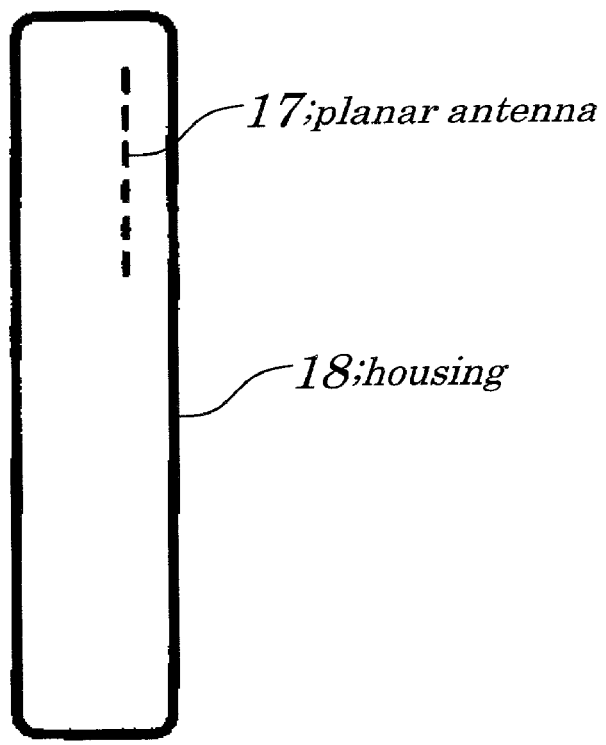
FIG. 2A is a diagram showing another conventional cellular phone using a planar antenna and FIG. 2B is a diagram showing a directivity of the planar antenna in the conventional cellular phone shown in FIG. 2A.
Figure 2B:
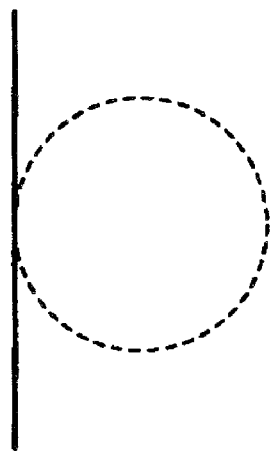
Figure 3A:
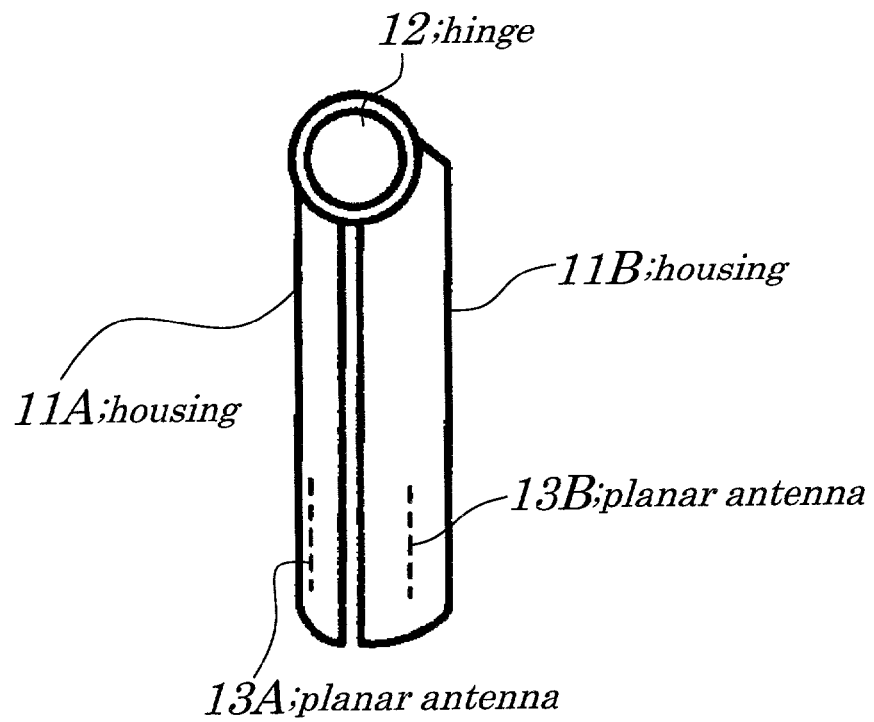
FIG. 3A is a side elevational view of a compact cellular phone in a closed state, according to an example of the present invention
Figure 3B:
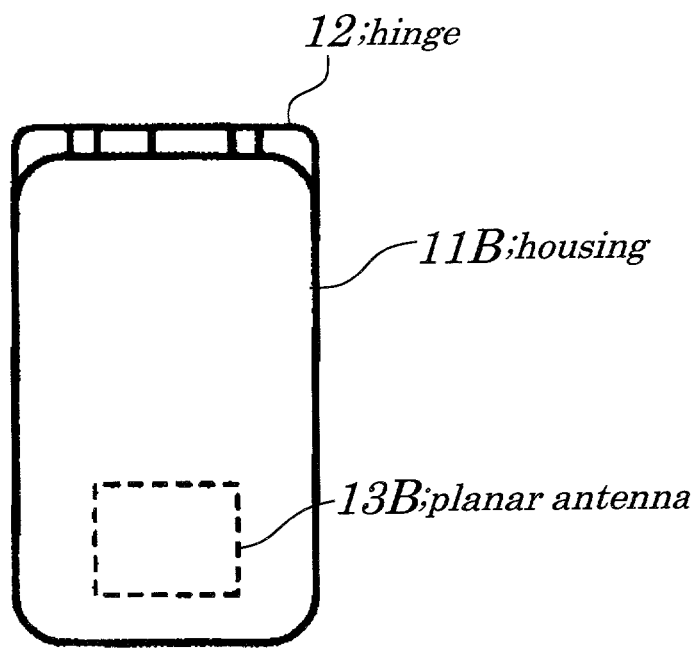
FIG. 3B is a rear elevational view of the compact cellular phone in the closed state, according to the example of the present invention.
Figure 4A:
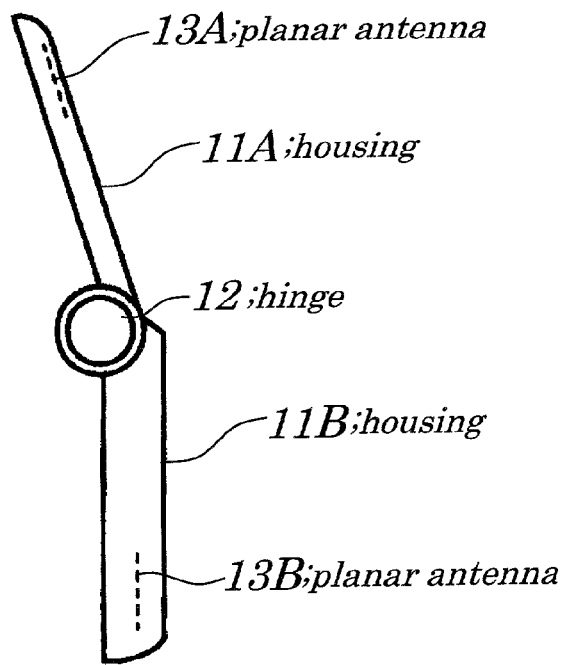
FIG. 4A is a side elevational view of the compact cellular phone in an open state, according to the example of the present invention
Figure 4B:
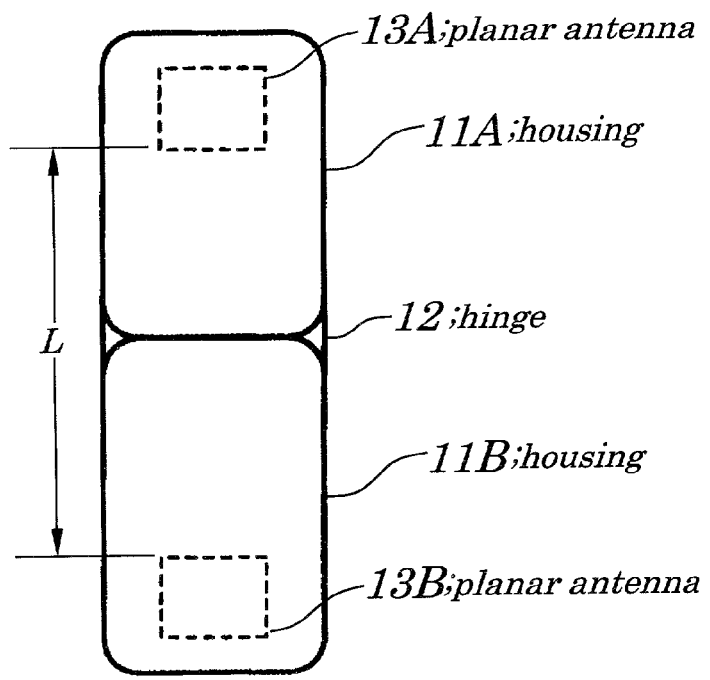
FIG. 4B is a rear elevational view of the compact cellular phone in the open state, according to the example of the present invention.

The example of the present invention will now be described with figures. FIGS. 3A and 3B and FIGS. 4A and 4B show schematic outside views of a compact cellular phone according to the example of the present invention. FIG. 3A is a side elevational view of the compact cellular phone in a closed state, according to the example of the present invention and FIG. 3B is a rear elevational view of the compact cellular phone in the closed state, according to the example of the present invention. FIG. 4A is a side elevational view of the compact cellular phone in an open state, according to the example of the present invention and FIG. 4B is a rear elevational view of the compact cellular phone in the open state, according to the example of the present invention. It should be noted that detailed parts that are not directly related to the present invention are not shown in figures and an explanation thereof is omitted.

A configuration of the compact cellular phone according to the example of the present invention is mostly similar to the conventional cellular phone which is foldable. A pair of housings 11A and 11B formed in an approximate flat shape is foldably connected by using a hinge 12, so that the compact cellular phone is foldable.

Each of the housings 11A and 11B are made up of synthetic resin and formed in a similar rectangular board shape. Similar to the conventional cellular phone, for example, a speaker and a display part are appropriately provided to the housing 11A and an operating part such as a ten-key and a microphone are provided to the housing 11B. These components are well-known and not illustrated and therefore, an explanation thereof is omitted.

In the example, planar antennas 13A and 13B having outward directivities are provided inside the pair of the housings 11A and 11B. That is, the planar antenna 13A is arranged inside the housing 11A so that a highly sensitive surface of the planar antenna 13A is directed outward when the compact cellular phone is closed, and also the planar antenna 3B is arranged inside the housing 11B so that a highly sensitive surface of the planar antenna 13B is directed outward when the compact cellular phone is closed.

In the open state (see FIG. 4A and FIG. 4B), an interval L between the planar antennas 13A and 13B is provided so as to be equal to or greater than the palm width. In the closed state, the planar antennas 13A and 13B are arranged outer most (closest to a outside surface) of the compact cellular phone (see FIG. 3A).

The planar inverse F-type antennas are applied to the planar antennas 13A and 13B. Such the planar inverse F-type antenna is well-known. For example, Japanese Examined Application No. Hei 02-013842 discloses the planar inverse F-type antenna. Alternatively, conventional patch antennas can be used as the planar antennas 13A and 13B. Theses antennas above have radiation characteristics having non-directivity in a surface direction on one side.

Figure 5A:
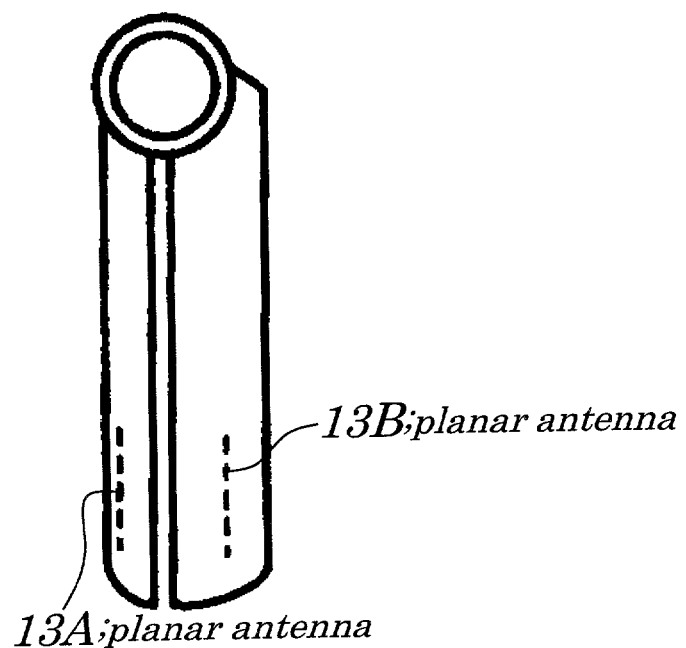
FIG. 5A is a side elevational view of the compact cellular phone in the closed state, according to the example of the present invention
Figure 5B:
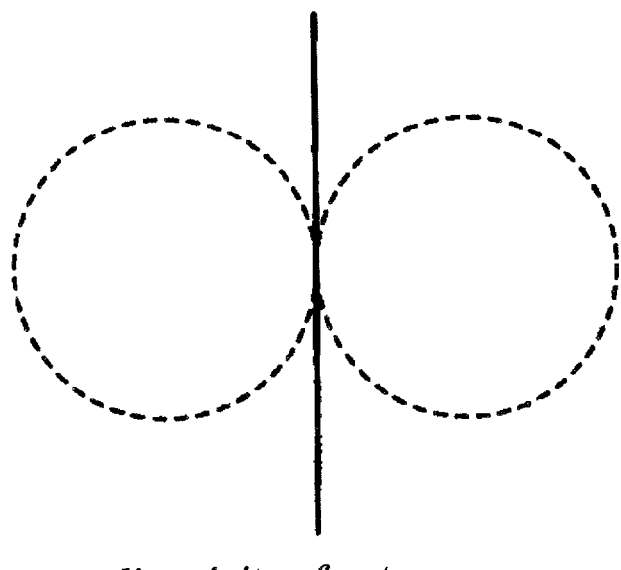
FIG. 5B is a diagram showing characteristics of directivities of planar antennas in the closed state, according to the example of the present invention.
Figure 6A:
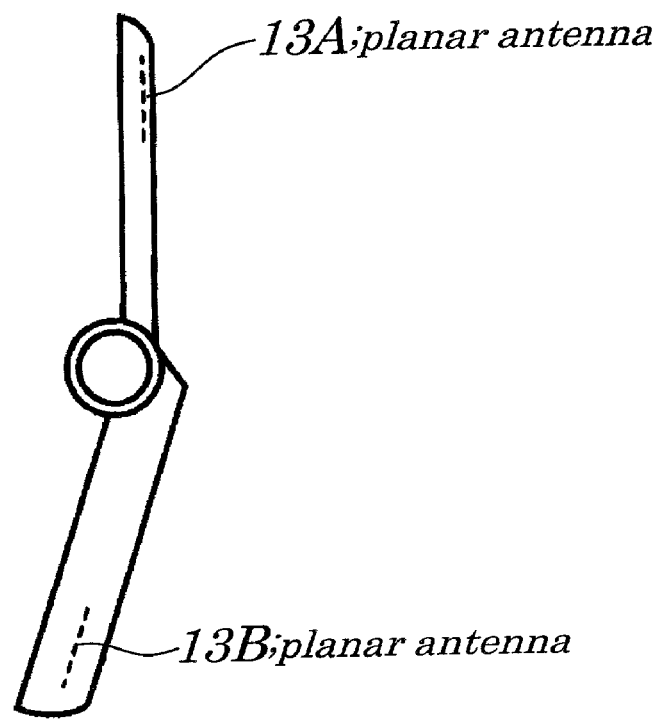
FIG. 6A is a side elevational view of the compact cellular phone in the open state, according to the example of the present invention
Figure 6B:
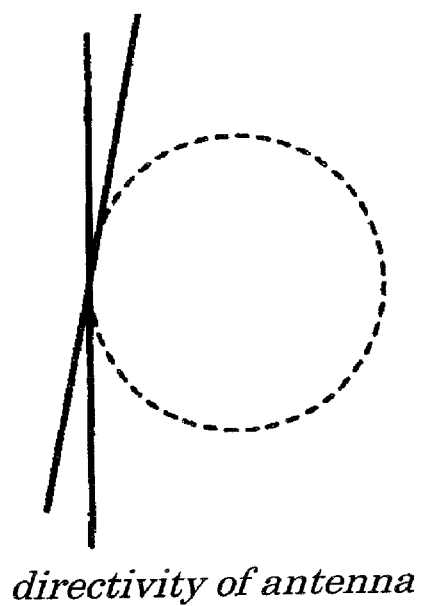
FIG. 6B is a diagram showing characteristics of directivities of the planar antennas in the open state, according to the example of the present invention.

Directivities of antennas of the compact cellular phone will be now described according to the example of the present invention. FIG. 5A is a side elevational view of the compact cellular phone in the closed state, according to the example of the present invention and FIG. 5B is a diagram showing characteristics of directivities of the planar antennas 13A and 13B in the closed state, according to the example of the present invention. FIG. 6A is a side elevational view of the compact cellular phone in the open state, according to the example of the present invention and FIG. 6B is a diagram showing characteristics of directivities of the planar antennas 13A and 13B in the open state, according to the example of the present invention.

In the closed state in which the compact cellular phone according to the example is closed (see FIG. 5A), the planar antennas 13A and 13B have directivities as shown in FIG. 5B and can send and receive at both sides of the compact cellular phone. Accordingly, one of the planar antennas 13A and 13B, which one planar antenna maintains preferred transmission between a base station (not shown) and the compact cellular phone, is selected and used. Since the planar antennas 13A and 13B are arranged outer most inside the housings 11A ad 11B, it is possible to reduce an influence of a metal board to the planar antenna 13A or 13B even if the compact cellular phone is placed on the metal board or the like.

On the other hand, in the opened state in which the compact cellular phone is open as shown in FIG. 6A, the planar antennas 13A and 13B have directivities towards a single direction opposite to a human body. Thus, an influence by the human body absorbing the radio wave becomes smaller and the preferred transmission characteristics can be maintained.

Figure 7A:
FIGS. 7A, 7B, and 7C are diagrams showing various usage of the compact cellular phone in a communication state, according to the example of the present invention.
Figure 7B:
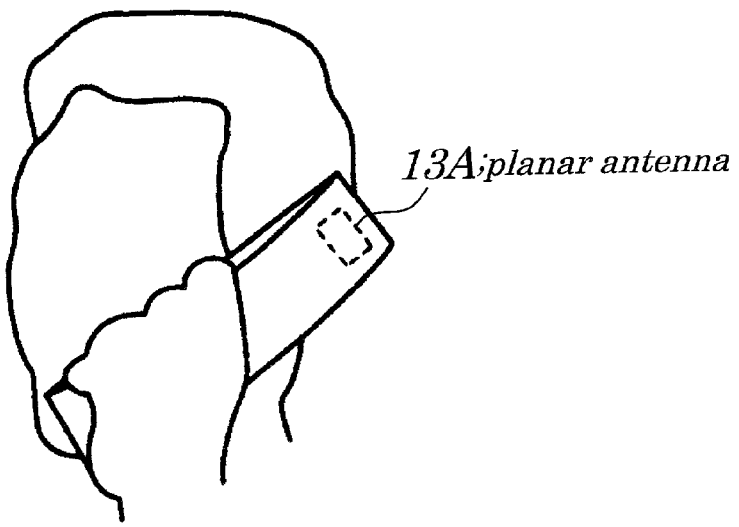
Figure 7C:
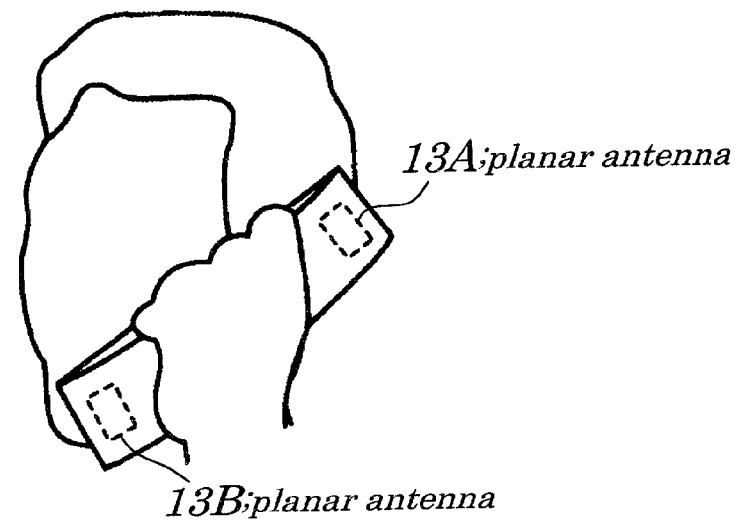

Moreover, in a radio wave absorption by the human hand holding the compact cellular phone, as shown in FIGS. 7A, 7B, and 7C, at least one of the planar antennas 13A and 13B is not covered with the human hand. Therefore, it is possible to obtain the preferred transmission characteristics by one of the planar antennas 13A and 13B, which one planar antenna 13A or 13B is not covered with the human hand. For example, when a user holds an upper part of the compact cellular phone (see FIG. 7A), since the planar antenna 13B being a lower part of the compact cellular phone is not covered with the human hand, the preferred transmission characteristics can be maintained by the planar antenna 13B. On the other hand, when the user holds the lower part of the compact cellular phone (see FIG. 7B), similarly, since the planar antenna 13A being the upper part of the compact cellular phone is not covered with the human hand, the preferred transmission characteristics can be maintained by the planar antenna 13A. When the user holds a center part of the compact cellular phone, both of the planar antennas 13A and 13B are not covered with the human hand.

Furthermore, the user holds the housing 11B of the compact cellular phone to use because of operating buttons located at the housing 11B while the user watches at a display part such as a liquid crystal display provided inside the housing 11A of the compact cellular phone. Even in this case, the preferred transmission characteristics can be maintained because the planar antenna 13A of the housing 11A is not covered with the human hand.

The following method can be applied to select one of the planar antennas 13A and 13B, which is not covered with the human hand. In a case in which the human hand covers one of the planar antennas 13A and 13B, an input impedance changes at a side of the planar antennas 13A or 13B which is covered with the human hand. Thus, by detecting and evaluating the impedance change and the physical quantity of the reflective wave caused by the impedance change on the electric-power transmission path provided inside the compact cellular phone, it can be determined whether or not the planar antennas 13A and 13B are influenced by the human hand. Also, it can be determined whether or not an influence degree is remarkable. Therefore, it is possible to select one of the planar antennas 13A and 13B, which is less influenced during a communication.

It is apparent that the present invention is not limited to the above embodiment and example but may be changed and modified without departing from the scope and spirit of the invention.

What is claimed is:

1. A cellular phone including first and second housings, forming a pair of housings, folded upon each other when the cellular phone is closed, said cellular phone comprising:

two planar antennas disposed within said pair of housings, respectively, so that a surface having the greatest directivity of each of said two planar antennas is directed outward when said cellular phone is closed, wherein when said cellular phone is used while being closed in a waiting state, both of said two planar antennas or either one of said two planar antennas is used to send or receive, and when said compact cellular phone is used while being open in a communication state, one of said two planar antennas, which has the better transmission state, is selected to send and receive, and wherein by detecting and evaluating an impedance change and a physical quantity of a reflective wave caused by said impedance change on an electric-power transmission path provided inside said cellular phone, one of said two planar antennas, which has preferred transmission characteristics, is determined, selected, and used.

2. The cellular phone according to claim 1, wherein an interval between said two planar antennas disposed within said pair of housings is equal to or wider than a width of a human palm when said cellular phone is open.

3. The cellular phone according to claim 2, wherein said two planar antennas are disposed at an outermost position inside said pair of housings, respectively, when said cellular phone is closed.

4. The cellular phone according to claim 2, wherein said two planar antennas are two planar inverse F-type antennas or two patch antennas.

5. The cellular phone according to claim 1, wherein said two planar antennas are disposed at an outermost position inside said pair of housings, respectively, when said cellular phone is closed.

6. The cellular phone according to claim 1, wherein said two planar antennas are two planar inverse F-type antennas or two patch antennas.

7. The cellular phone according to claim 1, wherein an interval between said two planar antennas disposed within said pair of housings is at least three inches when said cellular phone is open.

* * * * *